(12) United States Patent
Wu

(10) Patent No.: US 9,071,432 B2
(45) Date of Patent: Jun. 30, 2015

(54) METHOD OF HANDLING TRANSMISSION AND RECEPTION INVOLVING AN ABS SUBFRAME IN A WIRELESS COMMUNICATION SYSTEM AND RELATED COMMUNICATION DEVICE

(75) Inventor: Chih-Hsiang Wu, Taoyuan County (TW)

(73) Assignee: HTC Corporation, Taoyuan District, Taoyuan (TW)

( * ) Notice: Subject to any disclaimer, the term of this patent is extended or adjusted under 35 U.S.C. 154(b) by 86 days.

(21) Appl. No.: 13/314,184

(22) Filed: Dec. 8, 2011

(65) Prior Publication Data

US 2012/0147827 A1 Jun. 14, 2012

Related U.S. Application Data

(60) Provisional application No. 61/420,781, filed on Dec. 8, 2010, provisional application No. 61/423,101, filed on Dec. 15, 2010.

(51) Int. Cl.
*H04W 4/00* (2009.01)
*H04L 1/18* (2006.01)
*H04W 72/12* (2009.01)

(52) U.S. Cl.
CPC .............. *H04L 1/1854* (2013.01); *H04L 1/1887* (2013.01); *H04W 72/1289* (2013.01)

(58) Field of Classification Search
USPC ......... 370/328, 280, 312, 203, 329, 311, 335; 455/450, 501
See application file for complete search history.

(56) References Cited

U.S. PATENT DOCUMENTS

| 2011/0116437 A1* | 5/2011 | Chen et al. ............... 370/312 |
| 2012/0140690 A1* | 6/2012 | Choi et al. ............... 370/311 |
| 2012/0178482 A1* | 7/2012 | Seo et al. ................ 455/501 |
| 2013/0229940 A1* | 9/2013 | Baker et al. .............. 370/252 |

OTHER PUBLICATIONS

3GPP TSG-RAN WG2 Meeting #72, R2-106897 Jacksonville, US, Nov. 15-19, 2010 CR-Form-v9.7 Change Request 36.300 CR CR0278 rev—Current version: 10.1.0, "Introduction of time domain ICIC", Nov. 2010.
3GPP TS 36.321 V9.3.0 (Jun. 2010) Technical Specification 3rd Generation Partnership Project; Technical Specification Group Radio Access Network; Evolved Universal Terrestrial Radio Access (E-UTRA); Medium Access Control (MAC) protocol specification (Release 9).

* cited by examiner

*Primary Examiner* — Andrew Lai
*Assistant Examiner* — Jamaal Henson
(74) *Attorney, Agent, or Firm* — Winston Hsu; Scott Margo

(57) ABSTRACT

A method of handling transmission and reception involving an almost blank subframes (ABS) subframe for a mobile device in a wireless communication system is disclosed. The method comprises the mobile device being configured the ABS subframe by a network of the wireless communication system; and the mobile device stopping receiving a first packet transmitted by the network in a subframe, when the subframe is the ABS subframe.

10 Claims, 7 Drawing Sheets

METHOD OF HANDLING TRANSMISSION AND RECEPTION INVOLVING AN ABS SUBFRAME IN A WIRELESS COMMUNICATION SYSTEM AND RELATED COMMUNICATION DEVICE

CROSS REFERENCE TO RELATED APPLICATIONS

This application claims both the benefit of U.S. Provisional Application No. 61/420,781, filed on Dec. 8, 2010, entitled "Method and Apparatus for transmission and reception involving blank subframes in a wireless communication system", and the benefit of U.S. Provisional Application No. 61/423,101, filed on Dec. 15, 2010, entitled "Method and Apparatus for transmission and reception involving blank subframes in a wireless communication system", the contents of which are incorporated herein in their entirety.

BACKGROUND OF THE INVENTION

1. Field of the Invention

The present invention relates to a method used in a wireless communication system and related communication device, and more particularly, to a method of handling transmission and reception involving an almost blank subframes (ABS) subframe in a wireless communication system and related communication device.

2. Description of the Prior Art

A long-term evolution (LTE) system supporting the 3GPP Rel-8 standard and/or the 3GPP Rel-9 standard are developed by the 3rd Generation Partnership Project (3GPP) as a successor of a universal mobile telecommunications system (UMTS), for further enhancing performance of the UMTS to satisfy increasing needs of users. The LTE system includes a new radio interface and a new radio network architecture that provides a high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple UEs, and communicates with a core network including a mobility management entity (MME), a serving gateway, etc., for Non Access Stratum (NAS) control.

A LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint transmission/reception (CoMP), UL multiple-input multiple-output (MIMO), etc. For a UE and an eNB to communicate with each other in the LTE-A system, the UE and the eNB must support standards developed for the LTE-A system, such as the 3GPP Rel-10 standard or later versions.

Furthermore, to mitigate load in a hot spot of a cell (e.g. a macro cell) caused by a large number of clustered UEs, a smaller cell (e.g. a micro cell or a pico cell) is usually deployed at the hot spot of the cell. In this situation, a transmission of the cell and a transmission of the smaller cell may interfere with each other, when transmitters of both the cells transmit signals to respective UEs at the same time. Therefore, interference mitigation is needed to mitigate such interference. For example, a set of subframes is "blanked" by a cell in order to protect resources of other cell(s) in order to mitigate interference to transmissions on the set of subframes from the other cell(s). The set of subframes blanked is called Almost Blank Subframes (ABS). A subframe allocated to a UE can be configured as an ABS subframe for realizing the interference mitigation. When the subframe allocated to the UE is configured as the ABS subframe, the eNB may not transmit a packet in the subframe such that eNBs of neighboring cells can serve UEs of the neighboring cells (e.g. picocells) without interference in the subframe. In this situation, the UE should not try to receive the packet in the subframe to reduce power consumption, since the UE will receive nothing. However, the eNB may need to transmit the packet a subframe even though the subframe is configured as the ABS subframe in certain situations.

For example, when a subframe is allocated to a UE in a downlink (DL) semi-persistent scheduling (SPS) and the subframe is also configured as an ABS subframe, it is unknown whether the UE should attempt to receive a packet in the subframe. If the UE attempts to receive the packet in the subframe and the network does not transmit the packet, the UE receives nothing and transmits a negatively acknowledgement (NACK) corresponding to the packet. However, the NACK is unnecessary, and the UE wastes power on transmitting the NACK.

On the other hand, it may happen that a UE transmits a packet on an uplink (UL) subframe, and attempts to receive a hybrid automatic repeat request (HARQ) feedback (e.g. an ACK or a NACK) corresponding to the packet on a DL subframe. However, the DL subframe is configured as an ABS subframe. It is not known whether the network should transmits the HARQ feedback and whether the UE should attempt to receive the HARQ feedback.

Furthermore, when a UE performs a random access procedure, messages corresponding to the random access procedure are exchanged between the UE and an eNB. For example, please refer to FIG. 1, which is a transmission sequence diagram of the random access procedure according to the prior art. According to FIG. 1, the UE transmits a random access preamble (i.e., message 1) to the eNB to initiate the random access procedure. After the eNB receives the random access preamble, the eNB replies a random access response (i.e., message 2) to the UE to confirm the reception of the random access preamble. Then, the UE transmits a scheduled transmission (i.e., message 3) to the eNB according to information included in the random access response. The eNB resolves contention if multiple UEs request for resource at the same time, and transmits contention resolution (i.e., message 4) to the UE for allocating the resource to the UE. It may happen that at least one of the messages is scheduled in an ABS subframe. In this situation, it is not known whether the eNB and the UE should transmit or receive the at least one of the messages.

Therefore, how to resolve transmission and reception involving an ABS subframe is a topic to be addressed.

SUMMARY OF THE INVENTION

The present invention therefore provides a method and related communication device for handling transmission and reception involving an almost blank subframes (ABS) subframe in a wireless communication system to solve the above-mentioned problems.

A method of handling transmission and reception involving an almost blank subframes (ABS) subframe for a mobile device in a wireless communication system is disclosed. The method comprises the mobile device being configured the ABS subframe by a network of the wireless communication system; and the mobile device stopping receiving a first packet transmitted by the network in a subframe, when the subframe is the ABS subframe.

A method of handling transmission and reception involving an almost blank subframes (ABS) subframe for a mobile device in a wireless communication system is disclosed. The method comprises the mobile device being configured the ABS subframe by a network of the wireless communication system; and the mobile device attempting to receive a first packet transmitted by the network in a subframe, when the subframe is the ABS subframe.

A method of handling transmission and reception involving a first almost blank subframes (ABS) subframe and a second ABS subframe for a mobile device in a wireless communication system is disclosed. The method comprises the mobile device being configured the first ABS subframe and the second ABS subframe by a network of the wireless communication system; and the mobile device stopping transmitting a packet on a first uplink (UL) subframe to the network, if a hybrid automatic repeat request (HARQ) feedback corresponding to the packet is scheduled in the first ABS subframe or the first UL subframe is a second ABS subframe.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
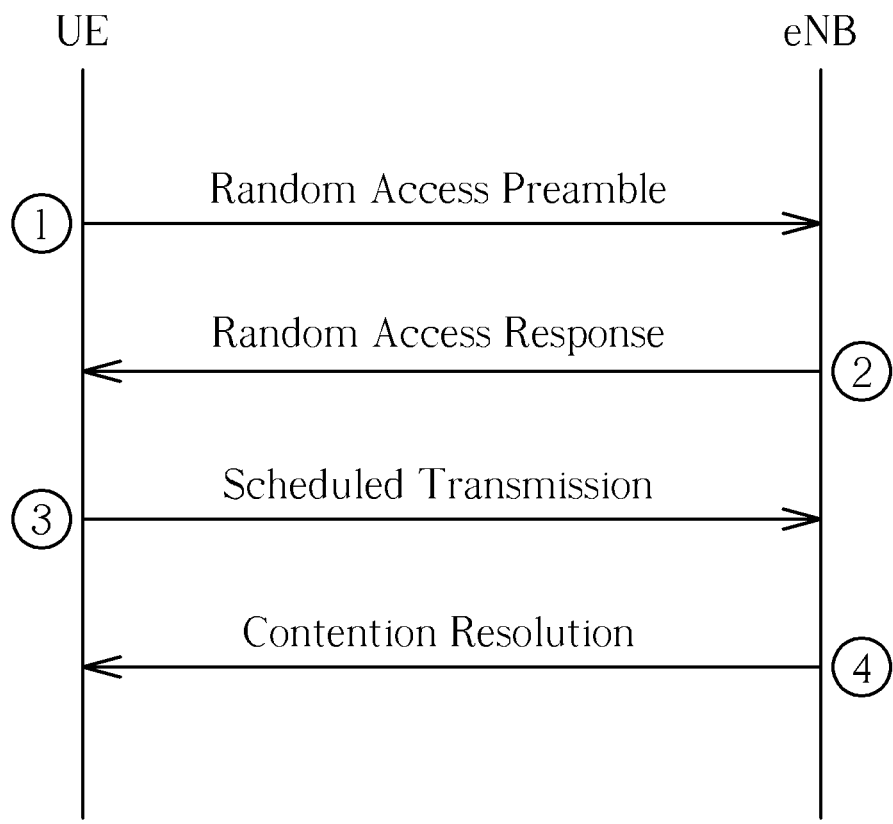
FIG. 1 is a transmission sequence diagram of a random access procedure according to the prior art.
Figure 2:
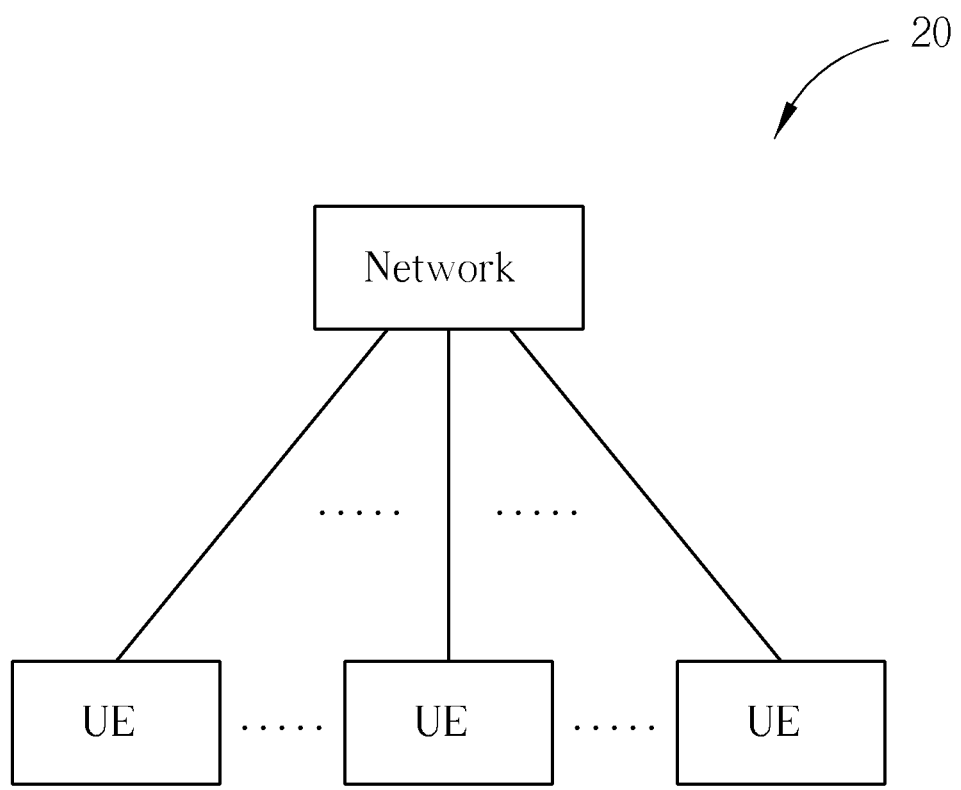
FIG. 2 is a schematic diagram of an exemplary wireless communication system according to the present invention.

Please refer to FIG. 2, which is a schematic diagram of a wireless communication system 20 according to an example of the present invention. The wireless communication system 20, such as a universal mobile telecommunications system (UMTS), a long term evolution (LTE) system or a LTE-Advanced (LTE-A) system capable of configuring and processing an almost blank subframes (ABS) subframe, is briefly composed of a network and a plurality of user equipments (UEs). In FIG. 2, the network and the UEs are simply utilized for illustrating the structure of the wireless communication system 20. Practically, the network can be referred as to a universal terrestrial radio access network (UTRAN) comprising a plurality of Node-Bs (NBs) in the UMTS or an evolved UTRAN (E-UTRAN) comprising a plurality of evolved NBs (eNBs) in the LTE system. Further, the network can be referred as to an E-UTRAN comprising a plurality of eNBs and relays in the LTE-A system, and are not limited herein. The UEs can be mobile devices such as mobile phones, laptops, tablet computers, electronic books, and portable computer systems. Besides, the network and a UE can be seen as a transmitter or a receiver according to transmission direction, e.g., for an uplink (UL), the UE is the transmitter and the network is the receiver, and for a downlink (DL), the network is the transmitter and the UE is the receiver.

Figure 3:
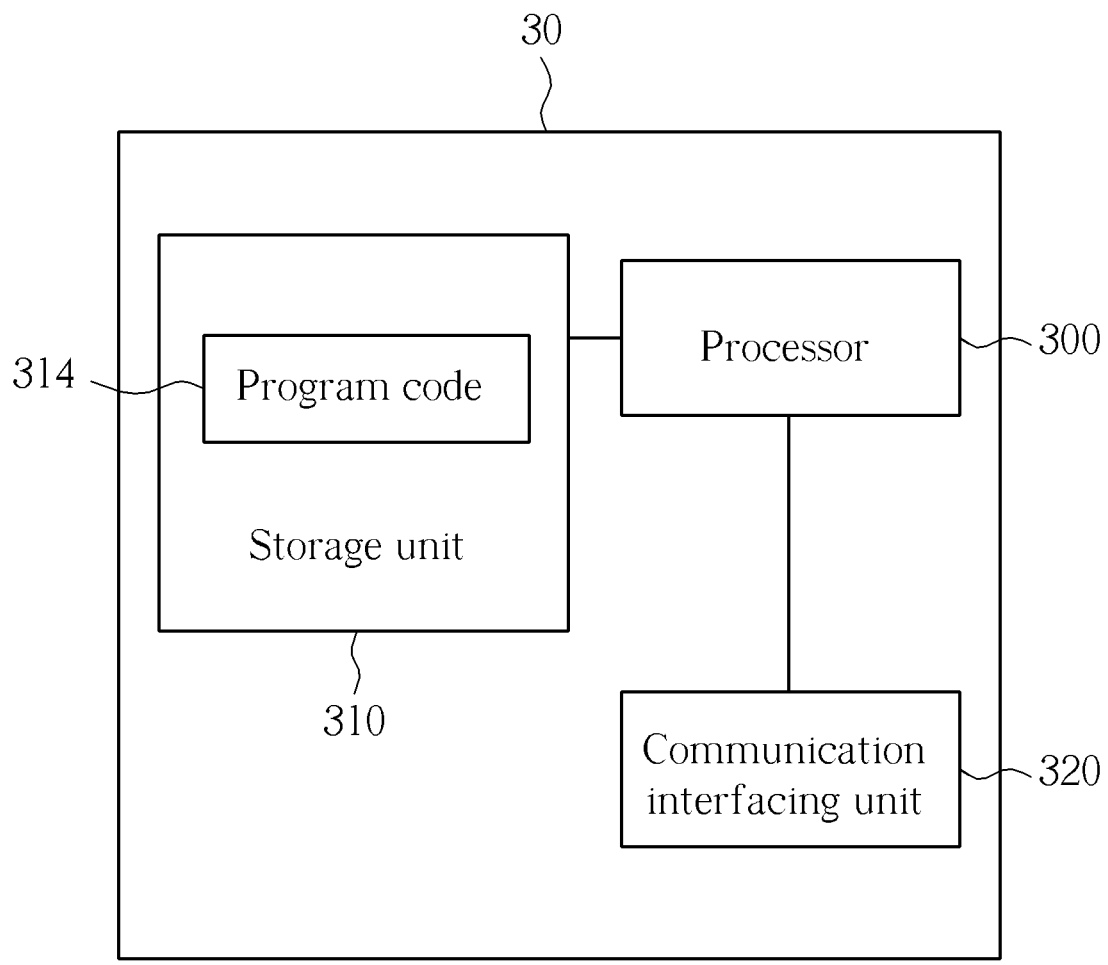
FIG. 3 is a schematic diagram of an exemplary communication device according to the present invention.

Please refer to FIG. 3, which is a schematic diagram of a communication device 30 according to an example of the present invention. The communication device 30 can be the UE or the network shown in FIG. 2, but is not limited herein. The communication device 30 may include a processor 300 such as a microprocessor or an Application Specific Integrated Circuit (ASIC), a storage unit 310 and a communication interfacing unit 320. The storage unit 310 may be any data storage device that can store a program code 314, accessed by the processor 300. Examples of the storage unit 310 include but are not limited to a subscriber identity module (SIM), read-only memory (ROM), flash memory, random-access memory (RAM), CD-ROM/DVD-ROM, magnetic tape, hard disk, and optical data storage device. The communication interfacing unit 320 is preferably a radio transceiver and can exchange wireless signals with the network according to processing results of the processor 300.

Figure 4:
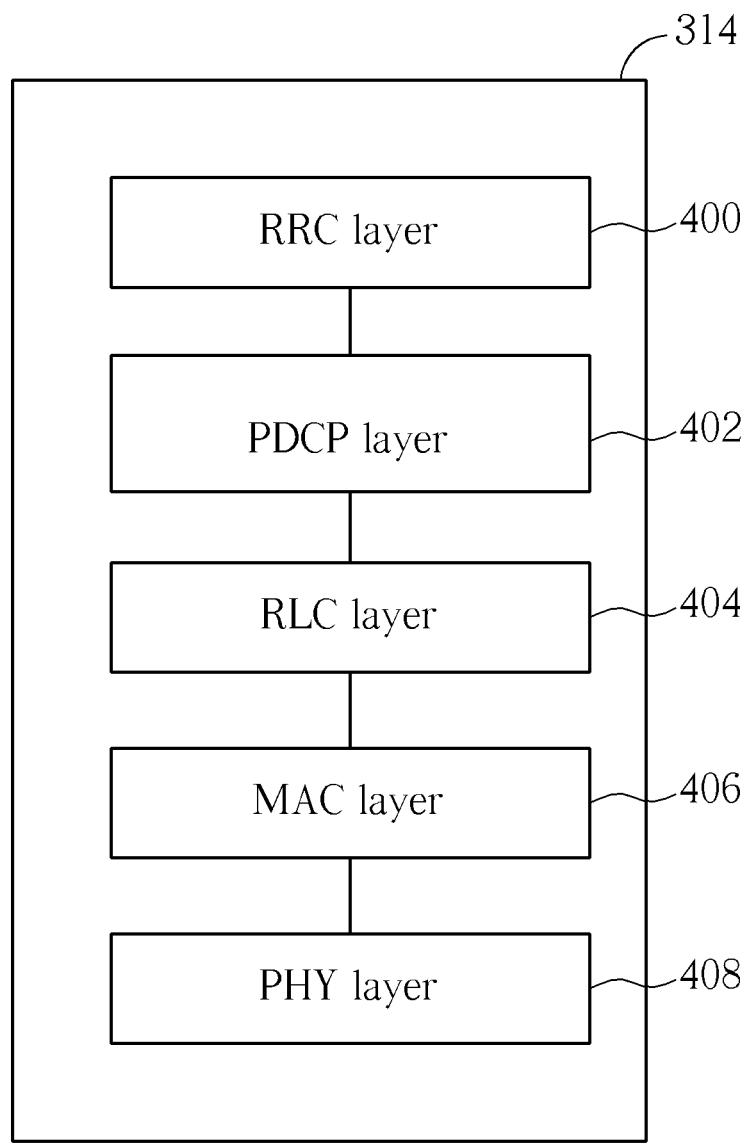
FIG. 4 is a schematic diagram of communication protocol layers for an exemplary wireless communication system.

Please refer to FIG. 4, which illustrates a schematic diagram of communication protocol layers for the wireless communication system 20. Behaviors of some of the communication protocol layers may be defined in the program code 314 and executed by the processor 300. The communication protocol layers from top to bottom are a radio resource control (RRC) layer 400, a packet data convergence protocol (PDCP) layer 402, a radio link control (RLC) layer 404, a medium access control (MAC) layer 406 and a physical (PHY) layer 408. The RRC layer 400 is used for performing broadcast, paging, RRC connection management, measurement reporting and control and radio bearer control generating or releasing radio bearers. The PDCP layer 402 is used for ciphering and integrity protection of transmissions, and maintaining delivery order during a handover. The RLC layer 404 is used for segmentation/concatenation of packets and maintaining delivery sequence when packet loses. The MAC layer 406 is used for handling a hybrid automatic repeat request (HARQ) process, multiplexing logical channels, a random access procedure and maintaining a UL timing alignment. In each HARQ process, an acknowledgement (ACK) is reported if the MAC data/control packet is received and decoded successfully. Otherwise, a negative acknowledgement (NACK) is reported. The PHY layer 408 is used to provide physical channels to the UEs and the network (e.g. a NB, eNB or relay). FIG. 4 simply illustrates the behaviors of the communication protocol layers conceptually, and detail of the behaviors may be different for the UMTS system, the LTE system and the LTE-A system. For example, the PDCP layer 402 is not used for transmissions of RRC messages in the UMTS system. Code division multiple access (CDMA) technology or time division multiple access (TDMA) is used for realizing the PHY layer 408 in the UMTS system. However, orthogonal frequency-division multiple access (OFDMA) or orthogonal frequency-division multiplexing (OFDM) is used for realizing the PHY layer 408 in the LTE system and the LTE-A system.

Figure 5:
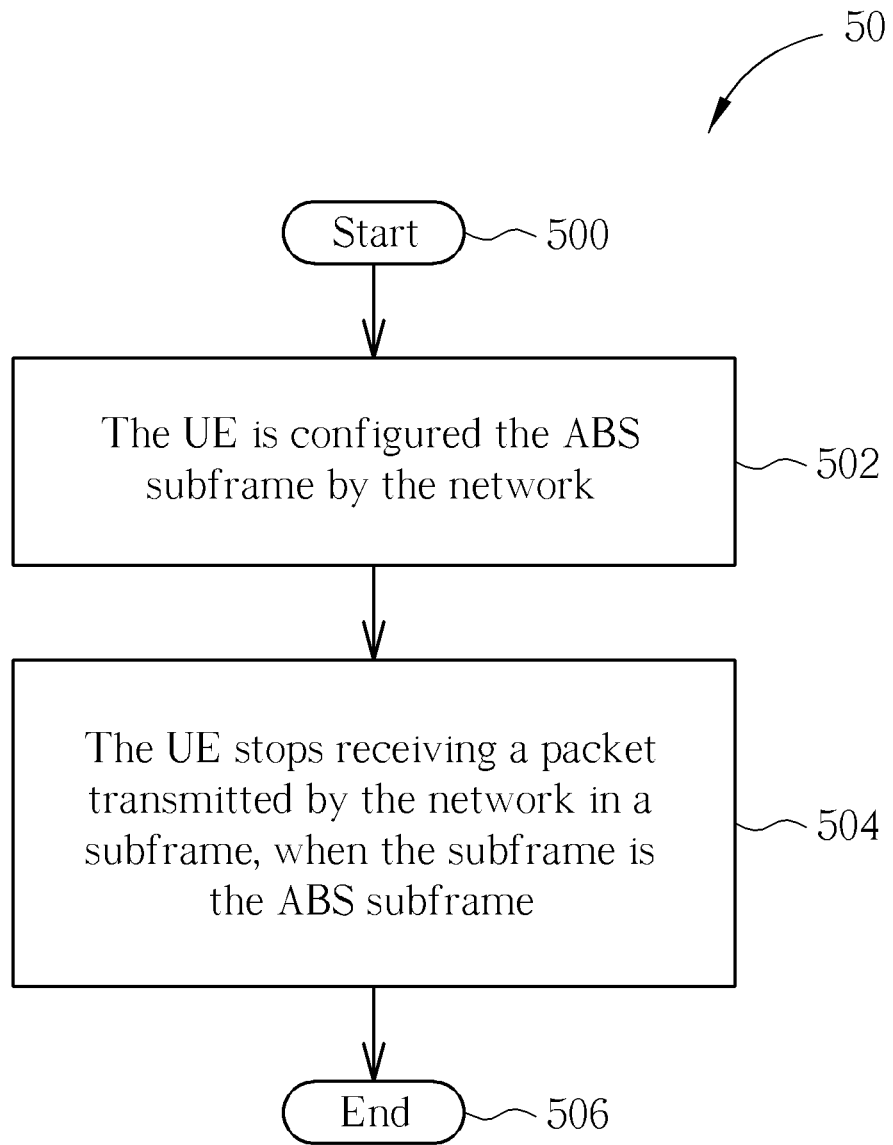
FIG. 5 is a flowchart of an exemplary process according to the present invention.

Please refer to FIG. 5, which is a flowchart of a process 50 according to an example of the present invention. The process 50 is utilized in a UE and the network shown in FIG. 2, for handling transmission and reception involving an ABS subframe. The process 50 may be compiled into the program code 314 and includes the following steps:

Step 500: Start.

Step 502: The UE is configured the ABS subframe by the network.

Step 504: The UE stops receiving a packet transmitted by the network in a subframe, when the subframe is the ABS subframe.

Step 506: End.

According to the process 50, after the network configures the ABS subframe to the UE, the UE stops receiving the packet transmitted by the network in the subframe, when the subframe is the ABS subframe. In other words, a priority of the ABS subframe is higher than priorities of other subframes. The UE does not attempt to receive the packet in the subframe when the subframe is configured as the ABS subframe. In this situation, the network should not transmit the packet to the UE in the subframe, since the UE will not attempt to receive the packet. Therefore, the UE does not waste power for receiving and decoding a packet which is not transmitted (e.g. empty), and the power can be saved.

Please note that, spirit of the process 50 is that the network stops transmitting and a UE stops receiving a packet in a subframe when the subframe is configured as an ABS subframe. A type of the subframe, situations in which the process 50 is applied and reactions taken by the UE and the network are not limited. For example, the network may configure the subframe to the UE by configuring DL semi-persistent scheduling (SPS) resource to the UE, i.e., the subframe is included in the DL SPS resource. Besides, since the UE does not receive the packet in the subframe, the UE may transmit a NACK corresponding to the packet to the network, for indicating that the packet is not received by the UE. Thus, the network can retransmit the packet in another subframe.

On the other hand, the network may intend to transmit a first packet including a HARQ feedback in a subframe to a UE, when the subframe is configured as an ABS subframe. That is, the UE has transmitted a second packet to the network, and the HARQ feedback in the first packet is used for indicating whether the second packet is correctly received by the network. In this situation, the network determines not to transmit the first packet to the UE, and the UE does not attempt to receive the first packet. Further, the UE may directly determine that the HARQ feedback is an ACK, and correspondingly configures ARQ_FEEDBACK for indicating the ACK. That is, the UE considers the second packet is correctly received by the network without receiving and checking the HARQ feedback. However, when the UE is performing a random access procedure and the second packet includes an important message (e.g. a message 3) used for the random access procedure, the UE needs to confirm whether the network correctly receives the second packet. Then, the UE should not transmit the second packet in the subframe but in another subframe, since the UE will not receive the HARQ feedback corresponding to the second packet. Thus, a situation that the UE misjudges the network correctly receives the important message can be avoided.

Besides, if a UE is performing a random access procedure, the UE may stop monitoring a physical DL control channel (PDCCH) in a subframe, for stopping receiving a packet including a message 2 or a message 4 in the subframe, when the subframe is configured as the ABS subframe. In other words, a priority of the ABS subframe is higher than a priority of the random access procedure. The network does not transmit the packet to the UE even if the network and the UE are performing the random access procedure.

Therefore, according to the above illustration and the process 50, the network and a UE determine not to transmit and receive a packet in a subframe, respectively, when the subframe is an ABS subframe. Power for attempting to receive the packet which is not transmitted is saved. Resource for transmitting the packet which will not be received is also saved. On the other hand, if a HARQ feedback corresponding to an important message is scheduled in the subframe, the important message should not be transmitted by the UE in advance for not missing the HARQ feedback transmitted corresponding to the important message. The network and the UE will not encounter an operation error due to loss of the important message.

Figure 6:
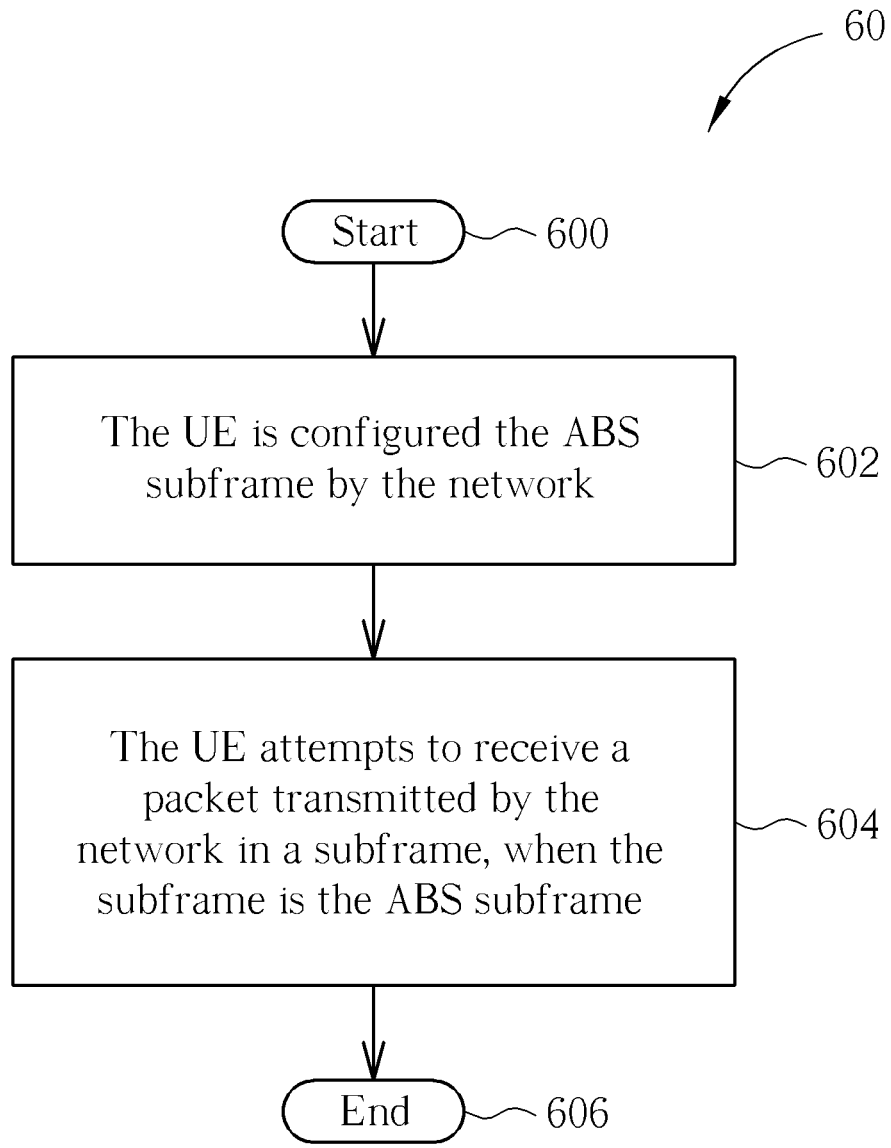
FIG. 6 is a flowchart of an exemplary process according to the present invention.

Please refer to FIG. 6, which is a flowchart of a process 60 according to an example of the present invention. The process 60 is utilized in a UE and the network shown in FIG. 2, for handling transmission and reception involving an ABS subframe. The process 60 may be compiled into the program code 314 and includes the following steps:

Step 600: Start.

Step 602: The UE is configured the ABS subframe by the network.

Step 604: The UE attempts to receive a packet transmitted by the network in a subframe, when the subframe is the ABS subframe.

Step 606: End.

According to the process 60, after the network configures the ABS subframe to the UE, the UE attempts to receive the packet transmitted with normal or reduced power by the network in the subframe, when the subframe is the ABS subframe. In other words, a priority of the ABS subframe is lower than priorities of other subframes. The UE receives the packet in the subframe when the subframe is configured as the ABS subframe. In this situation, the network should transmit the packet to the UE in the subframe, since the UE will attempt to receive the packet. Therefore, communications between the UE and the network are not interrupted and throughput of the UE is maintained, even though the ABS subframe is configured.

Please note that, spirit of the process 60 is that the network continues to transmit and a UE continues to receive a packet in a subframe when the subframe is configured as an ABS subframe. A type of the subframe, situations in which the process 60 is applied and reactions taken by the UE and the network are not limited. For example, the network may configure the subframe to the UE by configuring DL semi-persistent scheduling (SPS) resource to the UE, i.e., the subframe is included in the DL SPS resource. Besides, since the UE attempts to receive the packet in the subframe, the UE may transmit a HARQ feedback corresponding to the packet to the network, for indicating whether the packet is correctly received by the UE. Thus, the network can determine whether to retransmit the packet in another subframe.

On the other hand, the network may intend to transmit a first packet including a HARQ feedback in a subframe to a UE, when the subframe is configured as an ABS subframe. That is, the UE has transmitted a second packet to the network, and the HARQ feedback in the first packet is used for indicating whether the second packet is correctly received by the network. In this situation, the network continues to transmit the first packet to the UE, and the UE attempts to receive the first packet. Preferably, the HARQ feedback is an ACK if the network receives the second packet successfully, and is a NACK if the network does not receive the second packet successfully. After the UE receives the HARQ feedback, the UE correspondingly configures ARQ_FEEDBACK for indicating the ACK or the NACK. That is, the UE and the network ignore the ABS subframe, and continue to operate regularly. The above illustration is especially helpful when the UE is performing a random access procedure and the second packet includes an important message (e.g. a message 3) used for the random access procedure. In this situation, it is important for the UE to confirm whether the network correctly receives the second packet.

Besides, if a UE is performing a random access procedure, the UE continues to monitor a PDCCH in a subframe until a timer (e.g. mac-ContentionResolutionTimer) expires or stops, for receiving a packet including a message 2 or a message 4 in the subframe, when the subframe is configured as the ABS subframe. In other words, a priority of the ABS subframe is lower than a priority of the random access procedure. The network transmits the packet to the UE even if the packet is scheduled in the ABS subframe.

Therefore, according to the above illustration and the process 60, the network and the UE determine to transmit and receive a packet in a subframe, respectively, when the subframe is an ABS subframe. Communications between the UE and the network are not interrupted and throughput of the UE is maintained, even though the ABS subframe is configured. On the other hand, if a HARQ feedback corresponding to an important message is scheduled in the subframe, the UE still transmits the important message since the network will reply the HARQ feedback corresponding to the important message without affecting by the ABS subframe. The network and the UE will not encounter an operation error due to lack of the important message.

Figure 7:
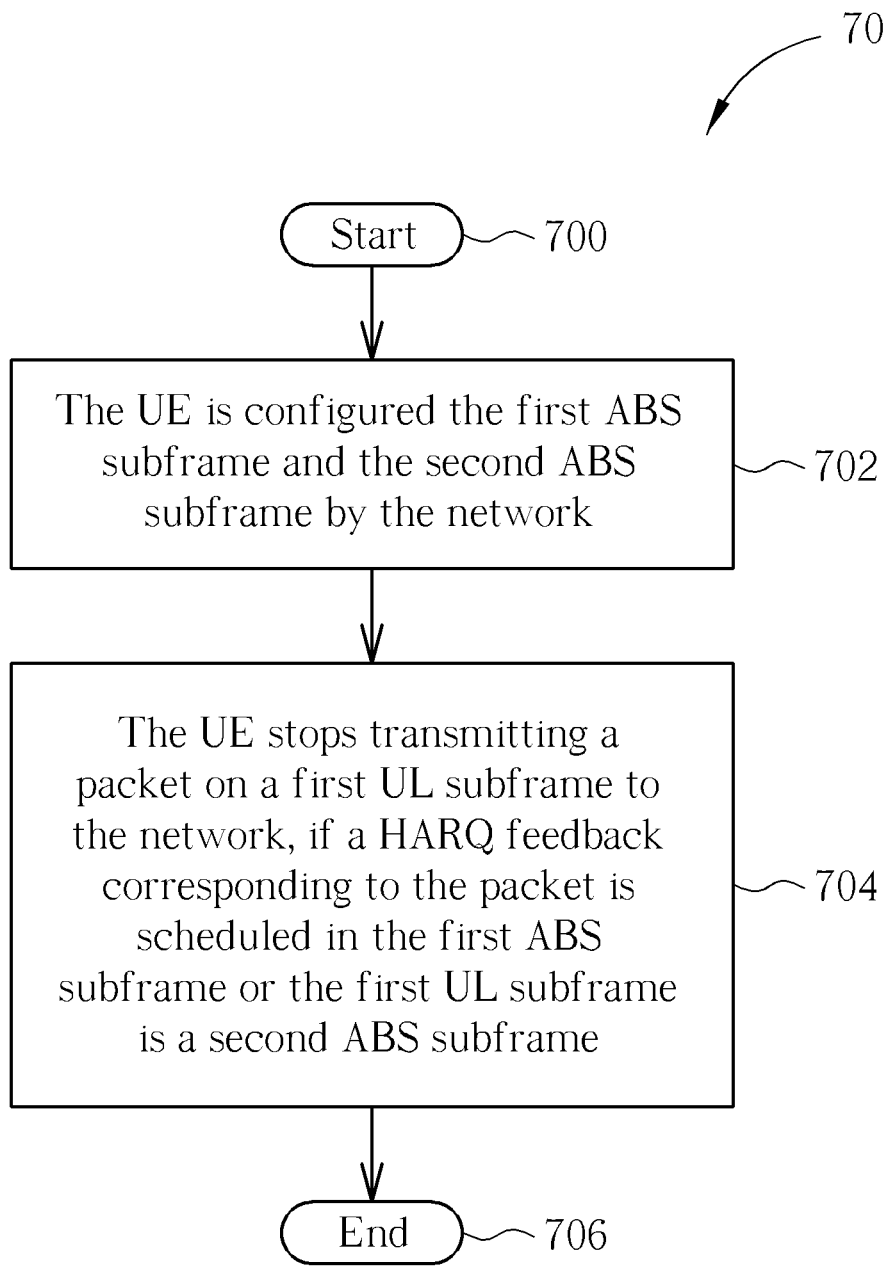
FIG. 7 is a flowchart of an exemplary process according to the present invention.

Please refer to FIG. 7, which is a flowchart of a process 70 according to an example of the present invention. The process 70 is utilized in a UE and the network shown in FIG. 2, for handling transmission and reception involving a first ABS subframe and a second ABS subframe. The process 70 may be compiled into the program code 314 and includes the following steps:

Step 700: Start.

Step 702: The UE is configured the first ABS subframe and the second ABS subframe by the network.

Step 704: The UE stops transmitting a packet on a first UL subframe to the network, if a HARQ feedback corresponding to the packet is scheduled in the first ABS subframe or the first UL subframe is a second ABS subframe.

Step 706: End.

According to the process 70, after the network configures the first ABS subframe and the second ABS subframe to the UE, the UE stops transmitting the packet on the first UL subframe to the network, if the HARQ feedback corresponding to the packet is scheduled in the first ABS subframe or the first UL subframe is the second ABS subframe, i.e. ABS subframe configured for a UL. In other words, the UE will not transmit the packet in advance, if the network may not transmit the HARQ feedback corresponding to the packet or the network may not attempt to receive the packet. Therefore, the network and the UE will not loss the packet and the HARQ feedback, respectively. Collision between the first UL subframe and the second ABS subframe and collision between the HARQ feedback corresponding to the first UL subframe and the first ABS subframe are resolved.

Please note that, spirit of the process 70 is that a UE stops transmitting a packet in a UL subframe when the UL subframe is an ABS subframe or when a HARQ feedback corresponding to the packet is scheduled in an ABS subframe. A type of the UL subframe, situations in which the process 70 is applied and reactions taken by the UE and the network are not limited. For example, the network may configure the UL subframe to the UE by using a dynamic scheduling or configuring SPS resource to the UE, i.e., the UL subframe is indicated in the dynamic scheduling or is included in the SPS resource. Besides, even though the UE does not transmit the packet according to an UL grant included in the dynamic scheduling or the SPS resource, the UE preferably processes the UL grant, e.g., obtaining control information included in the UL grant for necessary operation. Further, the UE may transmit the packet in another subframe according to a non-adaptive retransmission. The packet may include data (e.g. a MAC packet data unit (PDU)) or control information (e.g. a message 3 in a random access procedure), and is not limited herein.

Therefore, according to the above illustration and the process 70, a UE determines not to transmit a packet in a UL subframe when the UL subframe collides with another subframe or when a HARQ feedback corresponding to the packet is scheduled in an ABS subframe. Therefore, the network and the UE will not loss the packet and the HARQ feedback, respectively.

Please note that, the abovementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SiP), a computer on module (COM), and the communication device 30.

To sum up, the present invention provides methods for handling transmission and reception involving an ABS subframe in a wireless communication system, to resolve that a UE and the network do not operate synchronously due to the ABS subframe. Therefore, power and resource can be saved by handling the ABS subframe synchronously. On the other hand, communications between the UE and the network can be continued to maintain throughput of the UE. In either way, the network and the UE will not encounter an operation error due to loss or lack of an important message and its HARQ feedback.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling transmission and reception involving an almost blank subframes (ABS) subframe for a mobile device in a wireless communication system, the method comprising:

the mobile device being configured with the ABS subframe by a network of the wireless communication system;

the mobile device attempting to receive a first packet in a subframe transmitted by the network, when the subframe is the ABS subframe, wherein the first packet comprises a medium access control (MAC) protocol data unit (PDU); and the mobile device transmitting a hybrid automatic repeat request (HARD) feedback corresponding to the first packet to the network.

2. The method of claim 1, wherein the mobile device is configured downlink (DL) semi-persistent scheduling (SPS) resource by the network, and the DL SPS resource comprises the subframe.

3. The method of claim 1, wherein the network transmits the first packet in the subframe to the mobile device, when the subframe is the ABS subframe.

4. The method of claim 1, wherein the mobile device attempting to receive the first packet in the subframe transmitted by the network, when the subframe is the ABS subframe comprises:

the mobile device monitoring a physical DL control channel (PDCCH) in the subframe in a random access procedure, for attempting to receive the first packet in the subframe transmitted by the network, when the subframe is the ABS subframe.

5. The method of claim 4, wherein the first packet comprises a message 2 or a message 4 of the random access procedure.

6. A method of handling transmission and reception involving a first almost blank subframes (ABS) subframe and a second ABS subframe for a mobile device in a wireless communication system, the method comprising:
   the mobile device being configured with the first ABS subframe and the second ABS subframe by a network of the wireless communication system; and
   the mobile device stopping transmitting a packet on a first uplink (UL) subframe to the network, if a hybrid automatic repeat request (HARD) feedback corresponding to the packet is scheduled in the first ABS subframe or the first UL subframe is a second ABS subframe.

7. The method of claim 6, further comprising the mobile device processing an UL grant indicating the transmission in the first UL subframe corresponding to the first UL subframe.

8. The method of claim 6, wherein the packet comprises a message 3 of a random access procedure or a medium access control (MAC) packet data unit (PDU).

9. A method of handling transmission and reception involving an almost blank subframes (ABS) subframe for a mobile device in a wireless communication system, the method comprising:
   the mobile device being configured with the ABS subframe by a network of the wireless communication system;
   the mobile device transmitting a first packet to the network; and
   the mobile device attempting to receive a second packet in a subframe transmitted by the network when the subframe is the ABS subframe, wherein the first packet comprises a medium access control (MAC) protocol data unit (PDU) and the second packet comprises an HARQ feedback corresponding to the first packet.

10. The method of claim 9, wherein the first packet is transmitted by the mobile device to the network in a random access procedure.

* * * * *